United States Patent [19]
Woodland

[11] Patent Number: 4,563,381
[45] Date of Patent: Jan. 7, 1986

[54] PLASTIC HINGE

[75] Inventor: Rommel J. Woodland, Soccasunna, N.J.

[73] Assignee: Petro Plastics Company, Inc., Garwood, N.J.

[21] Appl. No.: 668,385

[22] Filed: Nov. 5, 1984

[51] Int. Cl.[4] .......................... B32B 3/26; B32B 27/00
[52] U.S. Cl. ...................................... 428/156; 16/225; 16/DIG. 13; 428/213; 428/483
[58] Field of Search ............... 428/156, 212, 213, 483; 264/171, 177 R; 52/631; 16/DIG. 13, 225

[56] References Cited
U.S. PATENT DOCUMENTS 3,445,052  5/1969  Lewallen ...................... 16/DIG. 13
4,089,467  5/1978  Makowicki ................... 16/DIG. 13

FOREIGN PATENT DOCUMENTS 2517078 10/1976 Fed. Rep. of Germany .... 16/DIG. 13

*Primary Examiner*—Paul J. Thibodeau

[57] ABSTRACT

An extruded thermoplastic hinge having drastically improved ability to withstand flexure cycles at room as well as at low temperatures is disclosed. The hinge comprises a flexible cross-section of polyester elastomer and a co-extruded section of rigid or semi-rigid thermoplastic material selected from the group comprising rigid polyvinyl (PVC), acrylonitrile-butadyene-styrene (ABS), impact modified or general purpose acrylic or high impact styrene. The flexure cross-section may have the thickness ranging from ten percent to 100% of the thickness of the semi-rigid cross-section.

4 Claims, 4 Drawing Figures

PLASTIC HINGE

FIELD OF THE INVENTION

This invention relates to one-piece extruded plastic forms and, more particularly, to extruded shapes having a flexible cross-section portion adjoining two rigid cross-section members. Such shapes are frequently employed as hinges.

DESCRIPTION OF THE PRIOR ART

Heretofore, a variety of one-piece extruded plastic hinges with different cross-sectional patterns have been available to the trade. The different cross-sections of extruded shapes permit different methods of attaching the hinges to the structure that is to employ the hinge. A typical assortment of such shapes is shown, for example, in catalog 1981-A of Outwater Plastics, Inc. 99-101 President Street, Passaic, N.J. 07055. The variety of extruded hinge shapes may broadly be classified into two categories, each comprising a thin flexible section that serves as the flexible portion and two adjoining thicker, fairly rigid sections which may be fastened or affixed to the utilizing structure.

In the first category of the extruded hinge shape, at least one of the thicker, semi-rigid members may be "U-", "O-" or "G-" shaped while in the second category the semi-rigid members are substantially flat. "U-" shaped members may be paired or "O-" shaped and "G-" shaped members may be paired with the "O-" shaped member of one hinge designed to be received and retained within the cavity of the "G-" shaped member of another hinge so as to be capable of forming a series of iterative panels as in an accordion door. The openings in the U-shaped members of the first category of hinge may be designed to accommodate a given width of a leaf or plate of the structure that is to employ the hinge. The interior surfaces of the U-shaped members may be ridged or striated to facilitate the gripping of such leaves. The semi-rigid flat members of the second category of polypropylene hinge may be pre-drilled or equipped with sets of projecting studs to facilitate fastening to the utilizing structure. Another variety of second category polyproplyene hinge, which is sometimes made available to fabricators in rolls, is manufactured by Stokes Molded Products, Taylor Street, Trenton, N.J. 08638 and sold under the trademark "Polyhinge".

A familiar variation of the second category of one-piece extruded hinge may employ a book-binding type of construction comprising two thin flexible sections separated by a narrow, fairly rigid, thick section, each thin section adjoining a further heavy member so as to provide a dual hinged construction suitable for use, for example, as a notebook binding.

Extruded plastic hinges of the prior art are available in a variety of colors and are commonly fabricated of polypropylene material. Polypropylene, when extruded to a thickness of from 0.050 to 0.095 inches, offers sufficient rigidity, dimensional stability and strength to accommodate the leaves or plates of the structure to which the hinge is to be affixed and when extruded to a thinness of from 0.005 to 0.010 inches offers sufficient flexibility to allow the adjoining heavier-wall members to be oriented at any reasonable angle. In this fashion, one-piece plastic hinges extruded of different thicknesses of polypropylene have served as useful and convenient structures capable of being employed in a wide variety of applications.

Unfortunately, such one-piece extruded plastic hinges have not, heretofore, been successfully employed in applications wherein the hinge may be subjected to a large number of flexure cycles and hinge failure due to the tearing away or fatiguing of the thin-wall section has been encountered, especially in low temperature environments. Thus, while one-piece plastic extrusions have functioned reasonably well in static applications, as in the hinge-like angle brackets used in joining sections for office partitioning or as notebook binders, the structural weakness of the thin-wall, web-like sections of the hinge sooner or later causes the hinge to fail after a number of repeated flexings. It would be desirable, particularly in hinges for structures subjected to low temperatures, such as in some food handling applications, to have a hinge exhibiting the unitary construction and corrosion resistance characteristics of prior art plastic hinges but with improved flexibility, resilience, tear resistance and tensile strength.

While it may be thought that the substitution of some more resilient material such as flexible PVC (polyvinylchloride) for polypropylene might overcome flexure fatigue of the thin-section polypropylene, flexible PVC lacks the rigidity required for the adjoining members. While the use of flexible PVC in a dual extrusion with rigid PVC might, therefore, appear to offer the desired solution, and has, in fact, been used in accordion door construction, the degree of bonding of flexible and rigid PVC is difficult to control in practice. As a result hinges of flexible and rigid PVC tend to exhibit low transverse tensile and shear strength, i.e., the flexible PVC portion of such a hinge is often too easily "peeled" away from the rigid PVC when a relatively light transverse or shear load is applied.

SUMMARY OF THE INVENTION

In accordance with my invention, a one-piece plastic hinge construction having a high degree of resilience, high transverse tensile and shear strength (high resistance to tearing or debonding) and very high resistance to flexure fatigue is provided in which the thickness of the flexible section of the hinge may be adjusted to obtain the desired degree of flexibility without danger of debonding which might otherwise occur when the flexible section is made quite thin relative to the cross-section of the rigid members. In one illustrative example, a compound extrusion using B. F. Goodrich's GEON TM rigid PVC having a thickness of 0.060 inches and having a Shore D durometer of approximately 78–80 is joined by a thin section of polyester elastomer such as DuPont 4056 Hytrel TM having a Shore D durometer of approximately 40 and a thickness of only 0.010 inches provides an unexpectedly durable hinge which has successfully withstood over $2.5 \times 10^6$ flexure cycles at room temperature and over $1.4 \times 10^6$ cycles at $-40°$ F. In another illustrative example the flexible section of the co-extrusion may employ one of the thermoplastic copolyester and polyvinyl chloride blends described in U.S. Pat. No. 3,718,715 while the semi-rigid heavy sections are extruded of rigid PVC. In still further examples, the flexible section is preferably extruded of Hytrel 4056 in tandem with a rigid section selected from the group comprising (a) acrylonitrile-butadyene-styrene ("ABS") such as Borg Warner "Cycolac GSE1000"; (b) impact modified acrylic such as Rohm and Haas "Plexiglas" type "DR"; (c) general purpose acrylic such as Rohm and Haas "Plexiglas" type "VM"; or (d) high impact styrene such as American Hoechst type "9100" all of which have a melt temperature compatible with that of the Hytrel 4056.

DETAILED DESCRIPTION

Figure 1:
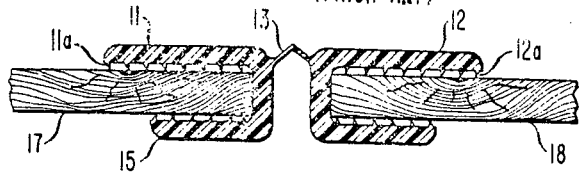
FIGS. 1, 2, and 3 show different cross-sectional forms of the one-piece extruded plastic hinges of the prior art.

FIG. 1 shows a cross-section taken through one form of first category one-piece extruded plastic hinge of the prior art. A first and a second U-shaped, semi-rigid member 11, 12 are joined together by a much thinner membrane section 13, portions 11, 12 and 13 being extruded of polypropylene thermoplastic material. Section 13 typically has a thickness of from 0.005 to 0.015 inches (about ten percent of the wall thickness of the semi-rigid members) and may be formed by a V-notch in the extruder die (not shown). The U-shaped members 11, 12 typically have a wall thickness 15 of from 0.050 to 0.060 inches to afford sufficient rigidity and dimensional stability securely to retain plates 17 and 18. In the drawing, U-shaped member 11 is shown retaining a plate 17 of the utilizing structure while member 12 is shown retaining plate 18. The interior surfaces of members 11 and 12 are equipped with ridges 11a, 12a to frictionally engage plates 17, 18. With plate 17 assumed to be the fixed part of the utilizing structure, flexible section 13 permits member 12 (and plate 18) to be rotated counterclockwise through an arc in excess of 120°, depending on the thickness and flexibility of section 13.

Figure 2:
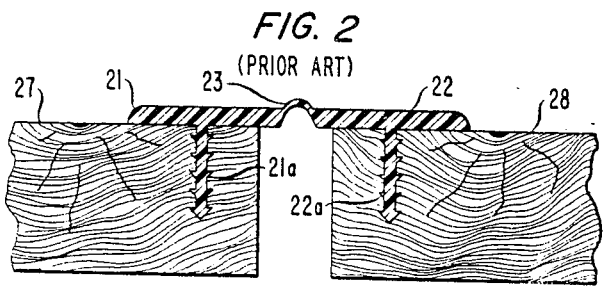

FIG. 2 shows a cross-section through one form of the second category of prior art, one-piece extruded hinge. A thermoplastic material such as polypropylene is extruded to define a first and a second flat, semi-rigid member 21, 22 and a much thinner or web-like section 23. The cross-sectional dimensions of sections 21, 22 and 23 of the prior art hinge of FIG. 2 correspond to the cross-sectional dimensions of sections 11, 12 and 13 of the prior art hinge shown in FIG. 1. Members 21 and 22 are equipped with projecting lugs 21a, 22a to facilitate fastening to the plates 27, 28, respectively, of the utilizing structure. Alternatively, members 21, 22 could be perforated (not shown) to facilitate riveting, stitching (not shown) or some other manner of mounting to plates 27, 28.

Figure 3:
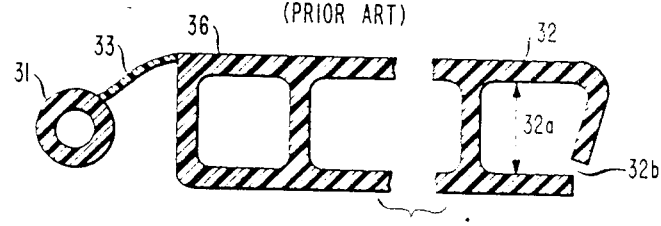

FIG. 3 shows a cross-section through another form of prior art hinge of the first category. This hinge is made as a dual extrusion of flexible and rigid PVC. O-shaped section 31 and G-shaped section 32 are extruded of rigid PVC while the intermediate web-like section 33 is extruded of flexible PVC. The hinge of FIG. 3 is designed to serve as the iterative panel of an accordion door assembly. The outside diameter of O-shaped section 31 is slightly smaller than the inside dimensions of cavity 32a thereby enabling the O-shaped section 31 of one panel to be slidably inserted into the cavity 32a of a neighboring panel (not shown); web member 33 of the one panel passing through the gap 32b of the neighboring panel. While this form of construction facilitates the easy assembly of neighboring panels, flexible PVC web member 33 tends to debond from the rigid PVC heavy wall member 32 at the point of juncture 36 when tensile or shear stress greater than a few psi are applied.

Figure 4:
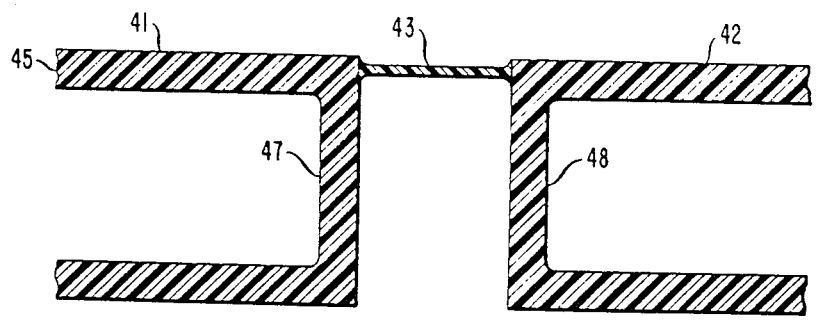
FIG. 4 shows a cross-section through the extruded hinge according to the principles of my invention.

Referring now to FIG. 4, a cross-section of an exemplary dual extrusion hinge construction according to the principles of my invention is shown which is applicable to both the first and second categories of hinges heretofore described; the portion depicted in FIG. 4 being confined to the region between the flexible section 43 and the adjoining rigid sections 41 and 42. In accordance with my invention the dual extrusion comprises a flexible section 43 of polyester elastomer such as Hytrel ™ #4056 manufactured by E. I. duPont deNemours & Co. (Inc.) Wilmington, Del. 18898, extruded in tandem with at least one semi-rigid section 41 or 42 (both being shown in FIG. 4) of a thermoplastic material selected from the group comprising (a) rigid polyvinylchloride ("PVC") such as B. F. Goodrich "GEON 8700A"; (b) acrylonitrile-butadyene-styrene ("ABS") such as Borg Warner "Cycolac GSE-1000"; (c) impact modified acrylic such as Rohm and Haas "Plexiglas" type "DR"; (d) general purpose acrylic such as Rohm and Haas "Plexiglas" type "VM"; or (e) high impact styrene such as American Hoechst type "9100", all of which have a melt temperature during extrusion which is compatible with that of the polyester elastomer such as DuPont "Hytrel 4056". Of these semi-rigid thermoplastic materials the ABS and PVC materials appear to form the strongest bonds with the ABS material being preferred for use in hinge applications such as automobile glove box hinges where combustion product considerations, for example, may be an important consideration. On the other hand, the impact-modified acrylic may be preferable in applications such as displays where clear plastic may be more aesthetically attractive of the examples, high impact styrene appeared to offer the least resistance to de-bonding by peeling or tearing away from the Hytrel ™.

In FIG. 4, flexible section 43 of polyester elastomer can be extruded to have a cross-sectional thickness of from 10% to 100% of the cross-sectional thickness of rigid sections 41 or 42. In one illustrative embodiment, a minimum cross-sectional thickness of approximately 0.015 inches has been achieved for flexible section 43 using a die (not shown) having a gap of 0.020 inches followed by post-extrusion sizing through water bath cooled water-formers (not shown) having a profile that is a duplicate of that of the extrusion die itself. On the other hand, air rather than water bath sizing is deemed to be preferable when co-extruding "Plexiglas" type "VM".

It should be noted that while the left and right hand ends of section 43 have been shown in the drawing as being slightly "filleted" at the points of juncture to sections 47 and 48, respectively, such thickening of section 43 is not necessary to achieve proper bonding whereas a considerable degree of filleting has, heretofore, often been required to bond a thin web of flexible PVC to a rigid section of PVC. While in FIG. 4 the semi-rigid members have been shown with channel shapes 47 and 48, it is to be understood that any desired profile may be employed depending on the extrusion die employed. Moreover, while flexible section 43 has been shown joined to two semi-rigid sections 41 and 42, in some applications, such as weather stripping, it may be desirable to eliminate one such rigid section entirely and to rely on the resiliency of the flexible section 43 to form a seal against the utilizing structure (not shown). Further and other modifications will be apparent to those skilled in the art without, however, departing from the spirit and scope of my invention.

What is claimed is:

1. A one-piece thermoplastic extrusion comprising a first portion of rigid thermoplastic material having a respective predetermined cross-sectional thickness along a defined linear region thereof, said rigid thermoplastic material being selected from the group consisting of rigid polyvinyl chloride (PVC), acrylonitrile-butadyene-styrene (ABS), impact modified or general purpose acrylic, and high impact styrene and a second portion of polyester elastomer joined to said first portion at said defined linear region.

2. A one-piece extrusion according to claim 1 wherein said first portion of rigid thermoplastic material includes a first and a second section and wherein said second portion has a cross-sectional thickness approximately equal to ten percent (10%) of said predetermined cross-sectional thickness of either said first or said second section of said first portion.

3. A one-piece thermoplastic extrusion according to claim 1 wherein the cross-sectional thickness of said second portion lies in the range from ten percent to 100 percent of said predetermined cross-sectional thickness.

4. A one-piece thermoplastic extrusion according claim 1 wherein said second portion is a blend of polyester elastomer and flexible polyvinylchloride.

* * * * *